Sept. 22, 1959     C. J. MITCHELL     2,904,815

TRANSPARENT METER DIAL GUARD WIPER

Filed Jan. 28, 1957

INVENTOR.
CARL J. MITCHELL
BY
Clinton L. Mathis
ATTORNEY

2,904,815
TRANSPARENT METER DIAL GUARD WIPER

Carl J. Mitchell, Seattle, Wash.

Application January 28, 1957, Serial No. 636,694

3 Claims. (Cl. 15—255)

My invention relates to a cleaning device for transparent meter-dial guards.

More particularly, my invention relates to an improvement over my Patent 2,680,874, issued January 15, 1954.

The invention of my said patent overcomes many obstacles theretofore existing in the art of cleaning meter dials, particularly water meter dials, as to moisture or fog on the inside surface of the guard which may be glass or a transparent plastic.

My present invention provides a device which is useful in connection with any opening in the dial guard whether the opening is marginally disposed or elsewhere.

Further my present invention provides for adjustability so that the same device can be used in many more sizes of meter. Also my present invention provides for a construction to suitably engage the wiping element and thus permit more precise and complete wiping.

Further my present invention permits the use of stampings so that the wiper may be economically and very substantially constructed.

Other objects and advantages of my invention will become apparent as the description of the same proceeds, and the invention will be best understood from a consideration of the following detailed description taken in connection with the accompanying drawings forming a part of the specification, with the understanding, however, that the invention is not to be limited to the exact details of construction shown and described since obvious modifications will occur to those skilled in the art.

In the following drawings like reference numerals will indicate like parts.

Figure 1:
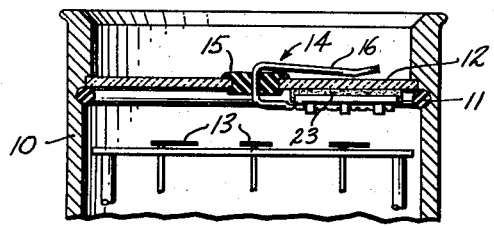
Figure 1 is a view partially in elevation and partially in section and with parts broken away of a typical water meter dial equipped with a device of my invention.
Figure 2:
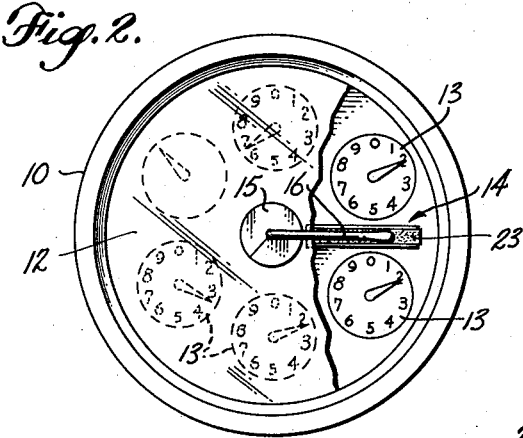
Fig. 2 is a view in plan and with parts broken away of Fig. 1.
Figure 3:
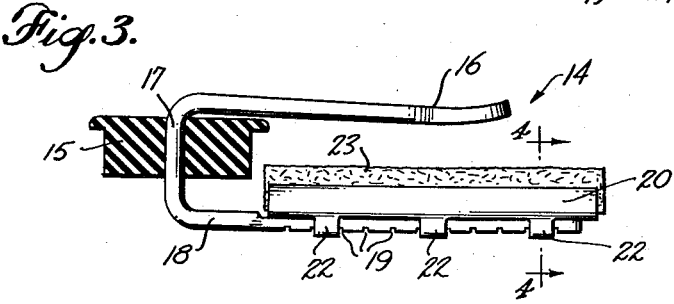
Fig. 3 is an enlarged detached view of a wiper embodying my invention.
Figure 4:
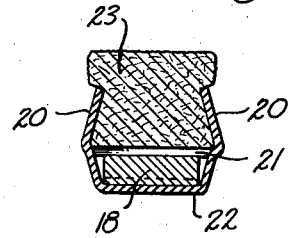
Fig. 4 is a view taken substantially on broken line 4—4 of Fig. 3 and is enlarged over Fig. 3.
Figure 5:
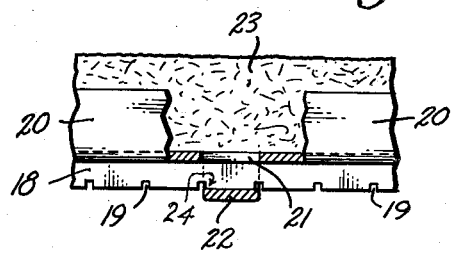
Fig. 5 is a fragmentary view of parts shown in Fig. 3 and in a larger scale than Fig. 3.

In the drawings, 10 designates the water meter casing; 11, the retainer ring for the transparent guard 12, and 13 the various dials to indicate cubic feet, fractions thereof, or multiples in ten thereof, all of which parts are conventional in water meters and need not be further described in detail. It is to be understood that these parts may be any of the ordinary constructions. It is the purpose of this invention to clean the inside surface of different types of meter or dial guards and which dial guards are generally made of glass and at times are made of transparent plastics. Also the dial guards are of different shapes in plan such as round, square, or rectangular.

In the drawings the wiper is generally referred to by 14 and the said wiper 14 comprises a substantially U-shaped member having a first or upper leg 16 positioned above the dial guard 12 and has a lower leg 18 which is positioned parallel to and below the dial guard 12. The legs 16 and 18 are interconnected by the middle leg 17 which passes through a recess in the guard 12. This recess may be along the marginal edges of the guard 12 or may be at locations intermediate the marginal portions of the guard 12 and in the drawings the opening is shown substantially centrally of a circular guard 12. The rubber mount 15 functions to seal an opening in the dial guard 12 and also mounts the intermediate leg 17. The said rubber fulcrum 15 functions to seal the opening in the glass and also seals around the middle leg 17 and thus prevents water from passing through the opening in the glass and on the dial. Also the said middle leg 17 is supported by 15 where 15 functions as a fulcrum.

The mounting means for the dial guard wiping felt 23 comprises a substantially U-shaped assembly comprising a base portion 21 which is positioned substantially parallel to the guard 12 and which base 21 supports side legs 20 which extend from the base 21 in the direction toward the guard 12 and the wiping felt 23 is clamped between the side walls 20. Thus the base 21 and the side walls 20 may be stamped in one operation from a rectangular piece of metal.

Next there is punched out of the bottom 21 and in a direction opposite to the side walls 20 straps 22 which are substantially U-shaped and the side legs of the U are integral with the base portion 21. Due to the fact that the said straps 22 are punched out of the base 21 there will appear tooth-like edge portions 24 and which will project in a direction toward the base 21.

The lower arm 18 of the wiper blade mounting assembly is preferably provided with serrations 19 and which are spaced apart a distance substantially equal to the spacing between tooth-like portions 24.

The base 21 and the straps 22 form a sleeve for the sliding reception therein of the lower leg 18 and any suitable adjustment will be retained due to the serrations 19 and the tooth-like edge portions 24. In other words the engagement of the tooth-like edge portions 24 in the serrations 19 constitutes an effective detent to provide a positive positioning grip between the arm 18 and the base 21 in plural longitudinal relative adjustments between these latter two members.

In assembling a device of my invention, the rubber fulcrum member 15 is preferably split so that it can be readily inserted over the middle leg 17. Then the U-shaped member 17—16—18 is threaded through an opening in the dial guard 12 and then the rubber fulcrum device 15 is interfitted with the opening to provide a water tight seal. Then the felt holding device is longitudinally slid in place by relative movement between the leg 18 and the sleeve formed by the base 21 and the straps 22 and with the felt 23 in place between the walls 20. Any desired relative longitudinal adjustment will be maintained because of the serrations 19 and the tooth-like edge portions 24.

From the foregoing it is obvious that I have provided a combination transparent guard and wiper therefor for use in connection with meters, as water meters, comprising a transparent guard 12 having a recess therethrough; a substantially U-shaped wiper blade having a first leg 16 and a second leg 18 disposed respectively above and below the transparent guard 12 and with the middle leg of the U-shaped wiper blade passing through a recess in the guard 12 and that the leg 18 has serrations 19 on its normally lower surface. Next I have provided a fulcrum forming means in the nature of the rubber member 15 which is a sealing device and also receives through an opening therein the middle leg 17 of the U-shaped wiper blade. Next I have provided a substantially U-shaped wiper blade mounting assembly which comprises a base portion 21 which is positioned substantially parallel to the guard 12 and there are spaced apart side legs 20 which extend in the direction of the guard away from the base and they clampingly receive between them the guard wiping element 23. Next I have provided substantially U-shaped straps 22 which have tooth-like margins and which are punched out of the base 21 and in a direction away from the guard and which form with the base 21 a sleeve to slidably receive therein the second leg 18 of the wiper blade and the tooth-like margins 24 of the straps 22 engage with the serrations 19 on the leg 18.

Obviously changes may be made in the forms, dimensions and arrangements of the parts of my invention without departing from the principle thereof, the above setting forth only a preferred form of embodiment of my invention.

I claim:

1. A guard wiper for a transparent meter guard plate having an opening therein comprising a substantially U-shaped wiper arm having first and second side legs disposed adjacent, respectively, the outer and inner faces of the transparent guard and middle leg passing through the opening in the guard; a fulcrum forming sealing device interfitting with said opening in said guard and having an opening therethrough receiving the middle leg of the U-shaped wiper arm; and a substantially U-shaped integral wiper blade mounting assembly comprising a base portion positioned substantially parallel said guard, a substantially U-shaped guard wiping element holder formed from said base portion and spaced apart side legs converging to frictionally hold a wiping element and extending toward said guard, a sleeve member carried by said base portion on the surface away from said guard and separated from said wiping element holder by said base portion, said sleeve member slidingly receiving therein said second leg of the wiper arm and detent means forming a part of said sleeve member and said second leg of the wiper arm to releasably hold the said member and leg against relative movement.

2. A guard wiper for a transparent meter guard plate having an opening therein comprising a substantially U-shaped wiper arm having first and second side legs disposed adjacent, respectively, the outer and inner faces of the transparent guard and middle leg passing through the opening in the guard; a fulcrum forming sealing device interfitting with said opening in said guard and having and opening therethrough receiving the middle leg of the U-shaped wiper arm; and a substantially U-shaped integral wiper blade mounting assembly comprising a base portion positioned substantially parallel said guard, a substantially U-shaped guard wiping element holder formed from said base portion and spaced apart side legs converging to frictionally hold a wiping element and extending toward said guard, a sleeve member carried by said base portion on the surface away from said guard and separated from said wiping element holder by said base portion, said sleeve member comprising a plurality of U-shaped members cooperating with said base to form the sleeve, said sleeve member slidingly receiving therein said second leg of the wiper arm and detent means forming a part of said sleeve member and said second leg of the wiper arm to releasably hold the said member and leg against relative movement.

3. A guard wiper for a transparent meter guard plate having an opening therein comprising a substantially U-shaped wiper arm having first and second side legs disposed adjacent, respectively, the outer and inner faces of the transparent guard and middle leg passing through the opening in the guard, the second leg of the guard being provided with serrations on its surface away from said guard; a fulcrum forming sealing device interfitting with said recess in said guard and having an opening therethrough receiving the middle leg of the U-shaped wiper arm; and a substantially U-shaped wiper blade mounting assembly comprising a base portion positioned substantially parallel said guard, a substantially U-shaped guard wiping element holder formed from said base portion and spaced apart side legs extending toward said guard, and a sleeve member carried by said base portion on the surface away from said guard and separated from said wiping element holder by said base portion, said sleeve member comprising a plurality of U-shaped strap members each having tooth-like edge portions, on the surface of the middle leg toward the guard, to interfit with the serrations on the second leg of the U-shaped wiper arm, said sleeve member slidingly receiving therein said second leg of the wiper arm.

References Cited in the file of this patent

UNITED STATES PATENTS

| Number | Name | Date |
|---|---|---|
| 737,439 | Michie | Aug. 25, 1903 |
| 1,448,517 | Brady | Mar. 13, 1923 |
| 1,749,049 | Turner | Mar. 4, 1930 |
| 2,047,118 | Rockwell | July 7, 1936 |
| 2,156,505 | Marcolivio | May 2, 1939 |
| 2,274,277 | Rousseau et al. | Feb. 24, 1942 |